United States Patent
Skalecki et al.

(10) Patent No.: US 9,608,719 B2
(45) Date of Patent: Mar. 28, 2017

(54) OPTICAL NETWORK CONNECTION TERMINATION ON CLIENT FACILITY FAILURE

(71) Applicants: Darek Skalecki, Ottawa (CA); Gary Swinkels, Ottawa (CA); Steven Arvo Surek, Leonardo, NJ (US)

(72) Inventors: Darek Skalecki, Ottawa (CA); Gary Swinkels, Ottawa (CA); Steven Arvo Surek, Leonardo, NJ (US)

(73) Assignee: Ciena Corporation, Hanover, MD (US)

( * ) Notice: Subject to any disclaimer, the term of this patent is extended or adjusted under 35 U.S.C. 154(b) by 87 days.

(21) Appl. No.: 14/568,826

(22) Filed: Dec. 12, 2014

(65) Prior Publication Data

US 2016/0173190 A1    Jun. 16, 2016

(51) Int. Cl.
| | |
|---|---|
| *G02F 1/00* | (2006.01) |
| *H04B 10/03* | (2013.01) |
| *H04B 10/07* | (2013.01) |
| *H04B 10/079* | (2013.01) |
| *H04B 10/077* | (2013.01) |

(52) U.S. Cl.
CPC ............ *H04B 10/03* (2013.01); *H04B 10/07* (2013.01); *H04B 10/0771* (2013.01); *H04B 10/0791* (2013.01)

(58) Field of Classification Search
CPC   H04B 10/07; H04B 10/0705; H04B 10/0771; H04B 10/0773; H04B 10/0775; H04B 10/0791; H04B 10/0793; H04B 10/0795; H04B 10/07955; H04B 10/03; H04J 14/0227; H04J 14/023; H04J 14/0232; H04J 14/0234; H04J 14/0236; H04J 14/0238; H04J 14/0239; H04J 14/0241; H04J 14/0242; H04J 14/0243; H04J 14/0245; H04J 14/0246; H04J 14/0247; H04J 14/025; H04J 14/0252
USPC ............................................................ 398/1
See application file for complete search history.

(56) References Cited

U.S. PATENT DOCUMENTS

| | | | | |
|---|---|---|---|---|
| 2002/0191247 | A1* | 12/2002 | Lu ........................ | H04B 10/03 398/79 |
| 2010/0067901 | A1* | 3/2010 | Mizutani ................ | H04B 10/03 398/20 |

* cited by examiner

*Primary Examiner* — M. R. Sedighian
(74) *Attorney, Agent, or Firm* — Osha Liang LLP

(57) ABSTRACT

A method for operating an optical network (ON) using a control plane (CP), including: identifying, by the CP, a failure of a client facility connecting a network element of the ON and a client device; and terminating, by the CP and in response to identifying the failure, an optical connection through the ON for the client device.

16 Claims, 6 Drawing Sheets

US 9,608,719 B2

OPTICAL NETWORK CONNECTION TERMINATION ON CLIENT FACILITY FAILURE

BACKGROUND

In control plane enabled optical networks, control plane connections are mesh restored when network facilities (e.g., ports) within the network fail. This restoration process is dependent on the availability of a mesh restoration route that meets the connection's service and routing constraints. However, the control plane does not react to failures that occur on the connection's client facilities, i.e. facilities (e.g., ports) leading to the client device at both ends of the connection. During such failures, the connection through the optical network remains, but no traffic can be successfully exchanged between the client devices at the two ends of the connection. In other words, network resources remain occupied despite the failure and are unavailable to other connections which may need these resources, for example, to mesh restore when they experience failures within the network.

SUMMARY

In general, in one aspect, the invention relates to a method for operating an optical network (ON) using a control plane (CP). The method comprises: identifying, by the CP, a failure of a client facility connecting a network element of the ON and a client device; and terminating, by the CP and in response to identifying the failure, an optical connection through the ON for the client device.

In general, in one aspect, the invention relates to a non-transitory computer readable medium (CRM) storing instructions for operating an optical network (ON). The instructions comprise functionality for: identifying a failure of a client facility connecting a network element of the ON and a client device; and terminating, in response to identifying the failure, an optical connection through the ON for the client device.

In general, in one aspect, the invention relates to a system. The system comprises: a network element, in an optical network (ON), connected to a client device by a client facility; and a control plane (CP) of the ON, associated with the network element, and configured to: identify a failure of the client facility between the network element and the client device, and terminate, in response to the failure, an optical connection through the ON for the client device.

Other aspects of the invention will be apparent from the following description and the appended claims.

DETAILED DESCRIPTION

Figure 1A:
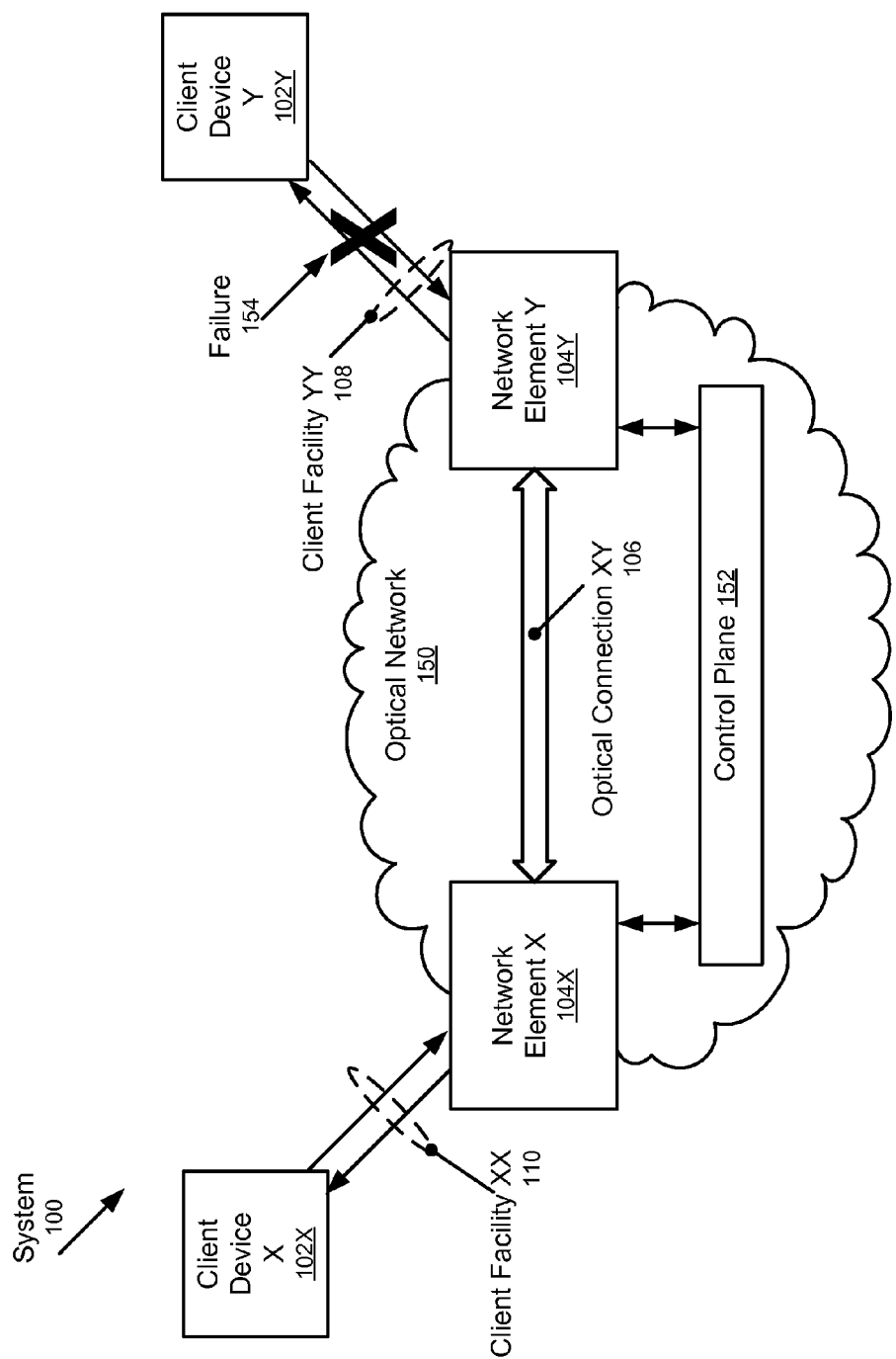
FIGS. 1A-1C depict blocks diagrams of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system, a method, and a computer readable medium for operating an optical network (ON) using a control plane. After identifying a failure of a client facility connecting a network element of the ON and a client device, the optical connection through the ON for the client device is terminated. This may release (i.e., free-up) network resources, including bandwidth, for use by other connections. Following a sleep interval (i.e., a timeout), an attempt is made to reestablish the optical connection through the ON for the client device. If the failure has been resolved (i.e., repaired, cured, removed, etc.), the reestablished connection is kept. However, if the failure is still present, the connection establishment fails or the established connection through the ON for the client device is once again terminated.

FIG. 1A shows a system (100) in accordance with one or more embodiments. As shown in FIG. 1A, the system (100) includes multiple client devices (e.g., client device X (102X), client device Y (102Y)) connected by an ON (150) in accordance with one or more embodiments. One or more client devices (102X, 102Y) may be configured to send data over the ON (150). Similarly, one or more client devices (102X, 102Y) may be configured to receive data over the ON (150). In one or more embodiments, the client devices (120X, 102Y) are configured to send/receive data in one or more signal types including Ethernet, digital video, Synchronous Optical Networking (SONET)/Synchronous Digital Hierarchy (SDH), G.709 Optical Transport Network (OTN), and other formats/protocols that are native to the client devices (102X, 102Y). The client devices (102X, 102Y) may be computing devices or networking devices of any type including servers, routers, switches, mobile phones, desktop or tablet personal computers (PCs), etc.

In one or more embodiments, the system (100) includes the ON (150). The ON (150) is a set of optical network elements connected by optical fiber links. The optical network elements are able to provide the functionality of transport, multiplexing, switching, management, supervision, and survivability of optical channels carrying client signals (i.e., signals to/from the client devices in various formats/protocols). Moreover, the ON (150) is designed to provide support for optical networking using wavelength-division multiplexing.

As shown in FIG. 1A, the ON (150) may include multiple network elements (e.g., network element X (104X), network element Y (104Y)) that are connected to the client devices (102X, 102Y). Specifically, network element X (104X) is connected to client device X (102X) by client facility XX (110). Similarly, network element Y (104Y) is connected to client device Y (102Y) by client facility YY (108). Both client facility XX (110) and client facility YY (108) may be facilities (e.g., ports, wires, fiber, cables, etc.) connecting the network elements (104X, 104Y) with their respective client devices (102X, 102Y). In one or more embodiments of the invention, network element X (104X) is configured to map signals from client device X (102X) into frames (e.g., OTN frames) for transport on the ON (150). As discussed above, the signals from client device X (102X) may have one or more formats/protocols including Ethernet and SONET. In one or more embodiments, network element Y (104Y) is configured to map frames transported over the ON (150) into signals for the client device Y (102Y). As discussed above, the signals to client device Y (102Y) may have one or more formats/protocols including Ethernet and SONET. In other words, network device X (104X) and network device Y (104Y) act as the interfaces (i.e., edge network devices) between the client devices (102X, 102Y) and the ON (150).

As shown in FIG. 1A, the ON (150) includes a control plane (152) in accordance with one or more embodiments. The control plane (152) has many functions including signaling (i.e., connection management). In other words, the control plane (152) is configured to create, modify, terminate (i.e., tear down), and restore (i.e., reestablish) connections in the ON (150). For example, optical connection XY (106) is a connection through the ON (150) for the client devices (102X, 102Y) that is established by the control plane (152). In addition to signaling, other control plane applications include discovery, routing, and path computation.

In one or more embodiments, the client facilities (108, 110) between the network elements (104X, 104Y) and the client devices (102X, 120Y) are susceptible to different types of failure. Some failure types are dependent on the signal type (e.g., Ethernet, SONET, etc.) being used by the client devices (102X, 102Y), while other failure types are possible regardless of the signal type (e.g., Ethernet, SONET, etc.) being used by the client devices (102X, 102Y). For example, possible failures on the client facilities (108, 110) include client-facing unidirectional failures, bidirectional failures, loss of frame, loss of data synchronization, excessive noise resulting in error ratios that exceed predetermined thresholds, loss of signal, etc.

As shown in FIG. 1A, there is a failure (154) on client facility YY (108) between network element Y (104Y) and client device Y (102Y). Both network element Y (104Y) and the control plane (152) are able to identify (i.e., detect, determine, etc.) the existence/presence of the failure (154). As a result of the failure (154), it is not possible for network element Y (104Y) to exchange data with client device Y (102Y). Accordingly, although there exists an optical connection XY (106) through the ON (150) between client device Y (102Y) and client device X (102X), optical connection XY (106) is not carrying any data traffic because of the failure (154), e.g. traffic from client device Y (102Y) to client device X (102X), or connection XY (106) is needlessly carrying data traffic which cannot be delivered to its destination, e.g. traffic from client X (102X) to client device Y (102Y). Those skilled in the art, having the benefit of this detailed description, will appreciate that optical connection XY (106), by its very existence, is still consuming network resources (e.g., bandwidth) even though it is not carrying any data traffic or is needlessly carrying data traffic.

As discussed above, the control plane (152) has many functions including signaling (i.e., connection management). In one or more embodiments of the invention, the control plane (152) is configured to terminate (i.e., tear down) optical connection XY (106) in response to the failure (154). By terminating optical connection XY (106), network resources are made available for other connections within the ON (150), including mesh restorations when connections experience failures within the ON (150).

In one or more embodiments, the control plane (152) is configured to reestablish, or at least attempt to reestablish, optical connection XY (106). In one or more embodiments, the control plane (152) delays/waits for a sleep interval before reestablishing optical connection XY (106). For example, the control plane (152) may wait 60 seconds (or any other time interval) before reestablishing optical connection XY (106). In one or more embodiments, the control plane (152) reestablishes the optical connection XY (106) to determine whether the failure (154) is still present or has been resolved. Specifically, the control plane (152) may rely on the clearance of an error detected (ED) signal asserted/sent by the client device to make the determination (discussed below). In one or more embodiments, the control plane (152) may periodically reestablish optical connection XY (106) to determine whether failure (154) is still present or has been resolved. Additionally or alternatively, the control plane (152) is event driven and may reestablish the optical connection XY (106) in response to a routing update, direct signaling notification from the client, or other event indicating that the failure (154) is resolved.

Although FIG. 1A only shows two client devices (102X, 102Y) and two network elements (104X, 104Y), those skilled in the art, having the benefit of this detailed description, will appreciate that the system (100) may have any number of client devices and network elements. Further, although FIG. 1A also shows a single client device connected to a network element (e.g., client device X (102X) connected to network element X (104X)), those skill in the art, having the benefit of this detailed description, will appreciate that multiple client devices may be connected to a single network element. Further still, a single client device may have multiple client facilities to one or more network devices, and thus there may be multiple optical network connections between the same pair of client devices.

Figure 1B:
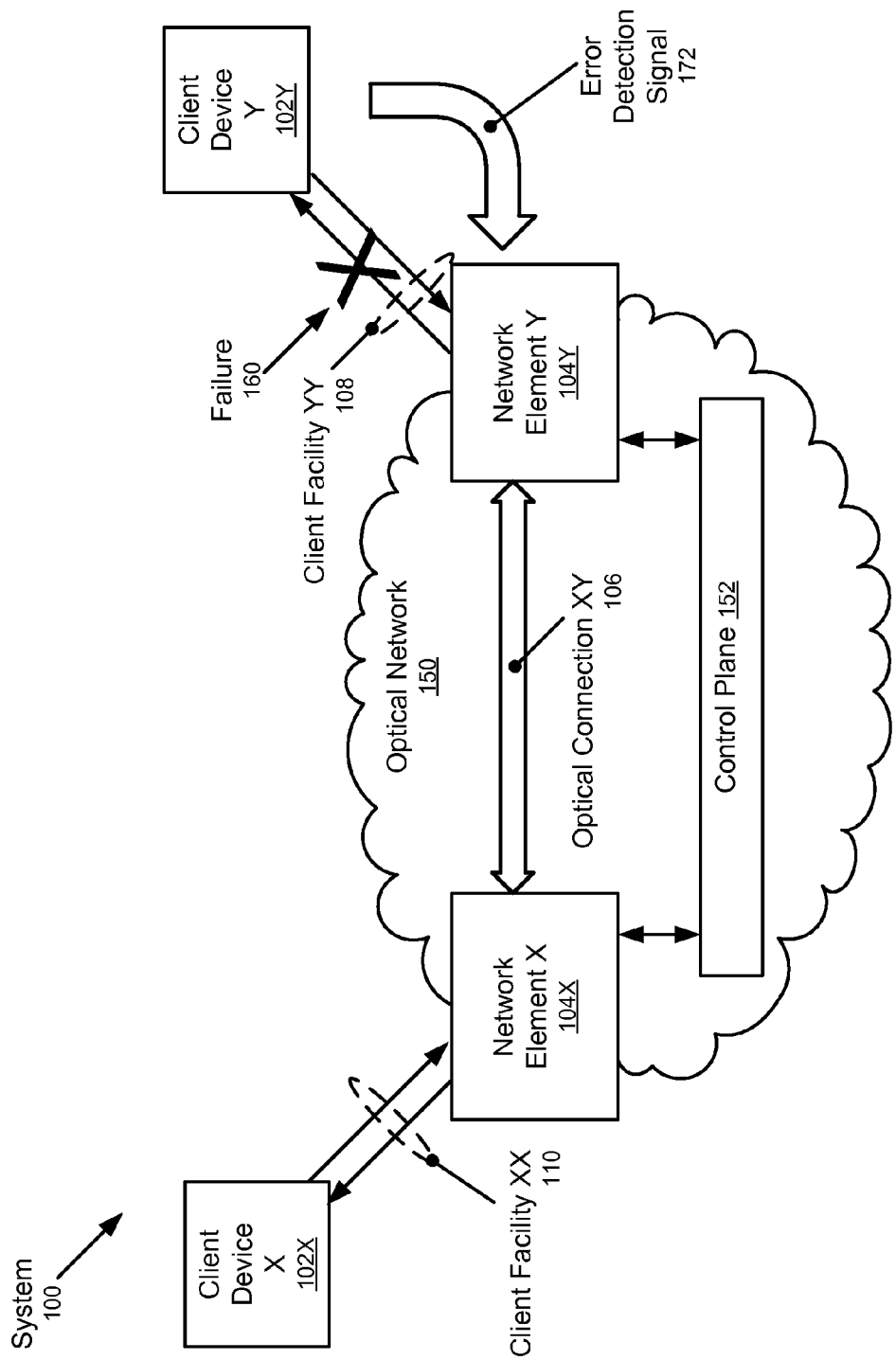

FIG. 1B also shows the system (100) in accordance with one or more embodiments. FIG. 1B is very similar to FIG. 1A. For example, like FIG. 1A, FIG. 1B shows multiple client devices (e.g., client device X (102X), client device Y (102Y)) connected by the ON (150) via network elements (104X, 104Y). Moreover, like FIG. 1A, the ON (150) includes the control plane (152).

As shown in FIG. 1B, there is a failure (160) on client facility YY (108) between network element Y (104Y) and client device Y (102Y). Failure (160) is a unidirectional failure towards client device Y (102Y). Client device Y (102Y) is able to identify (i.e., detect, determine, etc.) the failure (160). Moreover, client device Y (102Y) is configured to send (e.g., assert) an error detected (ED) signal (172) back toward network element Y (104Y) that indicates it has detected the incoming failure (160) on client facility YY (108). This ED signal (172) may be a remote fault (RF) signal. In one or more embodiments of the invention, it is through the arrival of the ED signal (172) that the network element Y (104Y) and/or the control plane (152) are able to identify the failure (160).

As a result of the failure (160), it is not possible for network element Y (104Y) to send data to client device Y (102Y). Accordingly, although there exists an optical connection XY (106) through the ON (150) for client device Y (102Y), optical connection XY (106) is not carrying any data traffic because of the failure (160), e.g. traffic from client device Y (102Y) to client device X (102X), or connection XY (106) is needlessly carrying data traffic which cannot be delivered to its destination, e.g. traffic from client device X (102X) to client device Y (102Y). In one or more embodiments, the control plane (152) is configured to terminate (i.e., tear down) optical connection XY (106) in response to the failure (160). By terminating optical connection XY (106), network resources are made available for other connections within the ON (150).

Figure 1C:
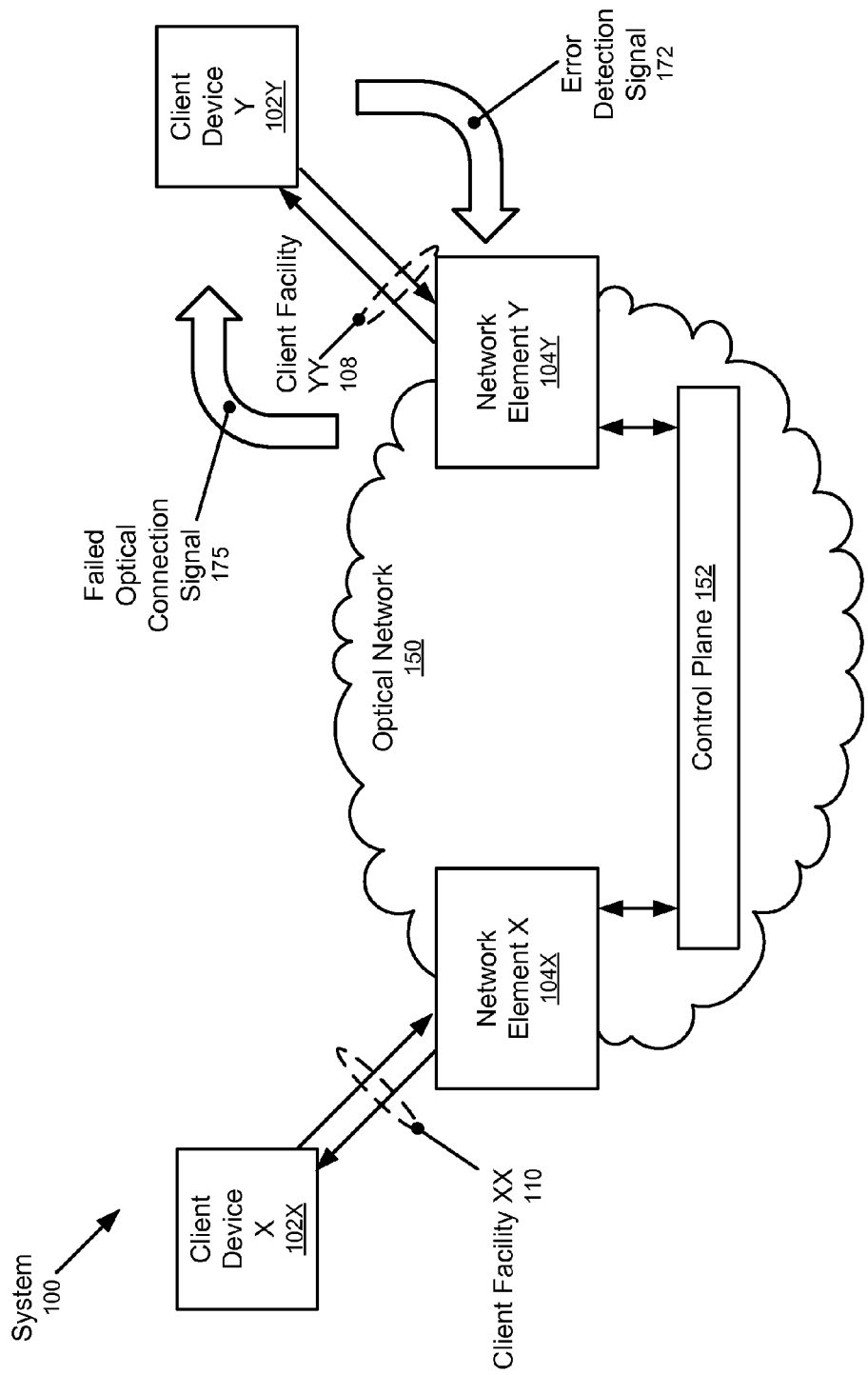

FIG. 1C also shows the system (100) in accordance with one or more embodiments. FIG. 1C is similar to FIG. 1A and FIG. 1B. For example, like FIG. 1A and FIG. 1B, there exists multiple client devices (e.g., client device X (102X), client device Y (102Y)) and the ON (150) has multiple network elements (104X, 104Y). Moreover, like FIG. 1A and FIG. 1B, the ON (150) includes the control plane (152).

However, FIG. 1C shows the ON (150) after the control plane (152) has terminated the optical connection XY (106). The termination may have been executed for any reason (e.g., failure (160), discussed above in reference to FIG. 1B). In one or more embodiments of the invention, in response to terminating optical connection XY (106), the network element Y (104Y) is configured to send (i.e., assert), or at least attempts to send, a failed optical connection (FOC) (175) signal toward client device Y (102Y) over client facility YY (108) indicating failure of the optical connection XY (106). The FOC signal is used as an indication to the client device that it is no longer receiving valid data and may take appropriate action. For example, the FOC signal (175) may be a local fault (LF) signal. The network element Y (104Y) is also configured to clear the FOC signal (175) if optical connection XY (106) is reestablished. In response to the FOC signal (175), client device Y (102Y) may be configured to send the ED signal (172), similar to the behavior illustrated by FIG. 1B when the client device detects an incoming unidirectional failure.

In view of FIG. 1B and FIG. 1C, there are at least two conditions that trigger client device Y (102Y) to send the ED signal (172): (i) upon detection, by client device Y (102Y), of a unidirectional client facing failure (e.g., failure (160)); and (ii) in response to the FOC signal (175) sent by network element Y (104Y). However, as discussed above, the ED signal (172) may be used by the control plane (152) to identify a failure on client facility YY (108), and thus trigger both the termination of optical connection XY (106) and the sending of the FOC signal (175). If the failure on client facility YY (108) is later resolved, the ED signal (172) remains asserted because of the FOC signal (175). This makes the ED signal (172) ambiguous. Specifically, the control plane (152) might be unable to determine whether the ED signal (172) is still asserted because the failure still exists, or whether the ED signal (172) is still asserted because the failure has been resolved and the FOC signal (175) is now being received by client device Y (102Y).

In one or more embodiments, the control plane (152) is configured to attempt reestablishment of optical connection XY (106) following the sleep interval. As mentioned above, the network element Y (104Y) is configured to clear the FOC signal (175) once optical connection XY (106) is reestablished. If the failure that originally triggered the termination of optical connection XY (106) has been resolved, clearing the FOC signal (175) will clear the ED signal (172) (i.e., client device Y (102Y) will stop sending the ED signal (172) if the FOC signal (175) is no longer received by the client device Y (102Y)). However, if the ED signal (172) is not cleared (e.g., after 5 seconds or some other time interval) by reestablishment of optical connection XY (106) (i.e., not cleared because the failure is still present), the control plane (152) is configured to once again terminate optical connection XY (106).

Although embodiments have focused on clearing the ED signal (172) by clearing the FOC signal (175) after reestablishing optical connection XY (106), in additional or alternative embodiments, network element Y (104Y) is configured to replace the FOC signal (175) with a valid data signal (e.g., idle frames) without optical connection XY (106) first being reestablished. In such embodiments, if the failure has been resolved, the valid data signal should trigger client device Y (102Y) to clear the ED signal (172). Then, with the ED signal (172) cleared, the control plane (152) can reestablish optical connection XY (106). Those skilled in the art, having the benefit of this detailed description, will appreciate that it might be necessary for the control plane (152) or network element X (104X) to confirm or receive confirmation that client facility YY (108) is operational (i.e., no failure present/detected) before reestablishing optical connection XY (106). In one or more embodiments, this assumes network element X (104X) is the source node for the optical connection XY (106). In other embodiments connections may be initiated from nodes other than the source node.

Figure 2:
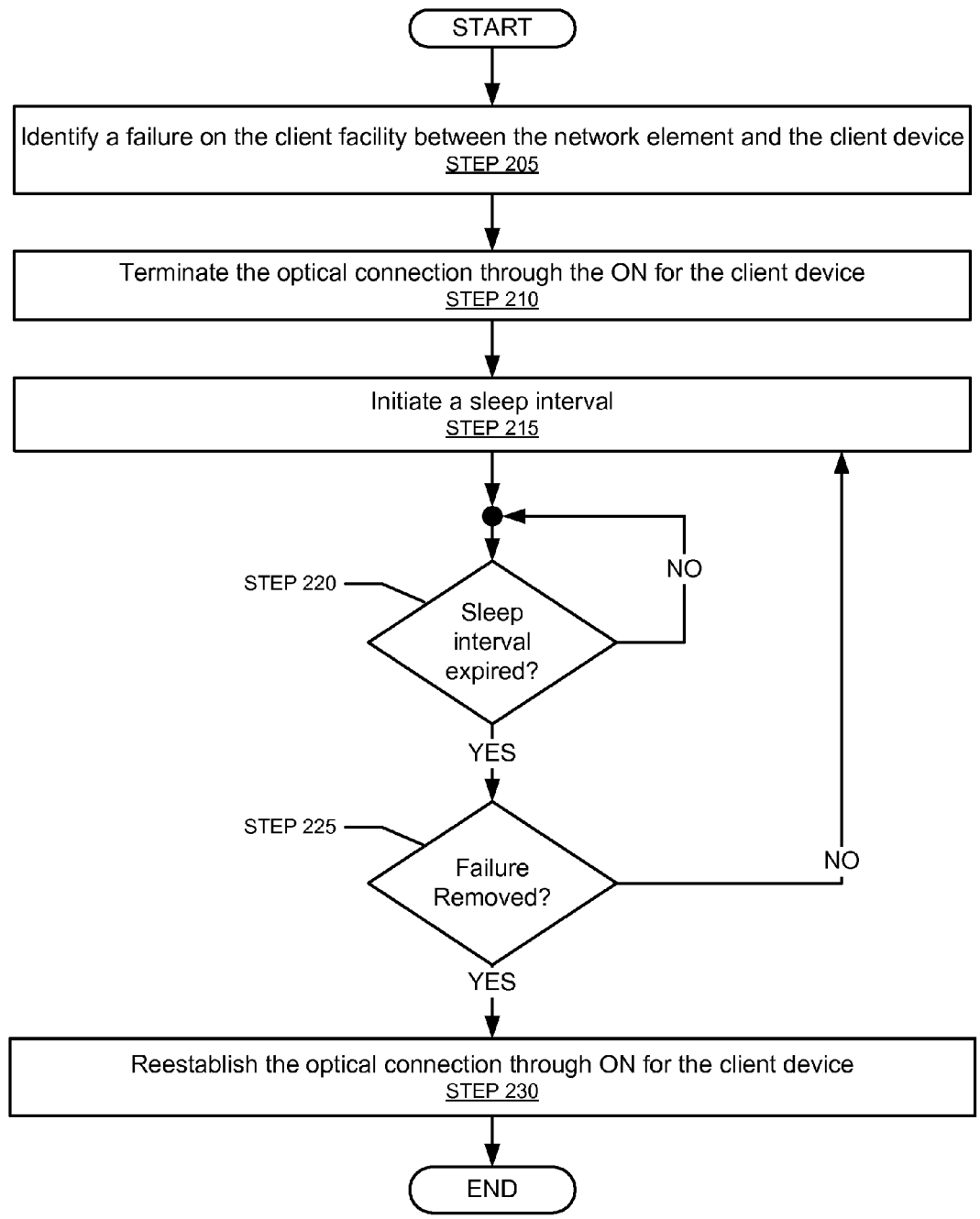
FIG. 2 and FIG. 3 show flowcharts in accordance with one or more embodiments of the invention.

FIG. 2 shows a flowchart in accordance with one or more embodiments. The process depicted in FIG. 2 may be used to operate an optical network using a control plane. The process shown in FIG. 2 may be executed, for example, by one or more components (e.g., control plane (152), network element (104Y), client device Y (102Y)) discussed above in reference to FIG. 1. One or more steps shown in FIG. 2 may be omitted, repeated, and/or performed in a different order among different embodiments of the invention. Accordingly, embodiments of the invention should not be considered limited to the specific number and arrangement of steps shown in FIG. 2.

Initially, a failure on the client facility between the network element and the client device is identified (STEP 205). As discussed above, the type of failure may be dependent on the signal type (e.g., Ethernet, SONET, etc.) that is used to exchange data between the network element and the client device. As also discussed above, some failure types are independent of the signal type. Possible failures include client-facing unidirectional failures, bidirectional failures, loss of frame, loss of data synchronization, excessive noise resulting in error ratios that exceed predetermined thresholds, loss of signal, etc. The failure may be identified by the control plane of the ON to which the network element belongs.

In STEP 210, the optical connection through the ON for the client device is terminated. Specifically, the optical connection is terminated in response to identifying the failure on the client facility between the network element and the client device. During the initial set up of the optical connection, a request may have been received to invoke a connection release attribute. In one or more embodiments, termination of the optical connection is only possible because the connection release attribute was set/invoked for this optical connection during its initial set up. Termination (i.e., tear down) of the optical connection may be executed by the control plane of the ON. In one or more embodiments of the invention, the reason for the termination (i.e., client facility failed) is carried in the release signaling message.

In STEP 215, a sleep interval is initiated. In one or more embodiments, the sleep interval is initiated in response to the release signaling message indicating that client facility failure is the reason for the termination (i.e., the sleep interval might not be initiated for terminations caused by other types of failures). The sleep interval may be of any duration (e.g., 60 seconds). Different sleep intervals may be of different durations. The sleep interval may be set by a network operator/administrator. The sleep interval may be initiated and monitored by the control plane of the ON. In STEP 220, it is determined whether the sleep interval has expired. When the sleep interval has expired, the process proceeds to STEP 225.

In STEP 225, it is determined whether the failure on the client facility between the network element and the client device is resolved (i.e., corrected, cured, removed, etc.). For example, it is determined whether the network element is still registering a loss of frame, loss of signal, loss of data synchronization, large errors in the received data, etc. Additionally, there may have been a routing update, direct signaling notification from the client device, or other event indicating that the failure is resolved. This determination may be executed by the control plane (152). When it is determined that the failure on the client facility between the client device and the network element is resolved, the process proceeds to STEP 230. When it is determined that the failure on the client facility between the client device and the network element is still present, the process may return to STEP 215.

In STEP 230, the optical connection through the ON is reestablished (i.e., restored) for the client device. Accordingly, the network element can resume receiving data over the reestablished optical connection and transmitting the data in the appropriate signal type (e.g., Ethernet, SONET, etc.) over the repaired client facility to the client device. Additionally or alternatively, the network element can resume receiving data over the repaired client facility from the client device and mapping the data, regardless of its signal type (e.g., Ethernet, SONET, etc.), into frames for transport across the reestablished optical connection of the ON.

Figure 3:
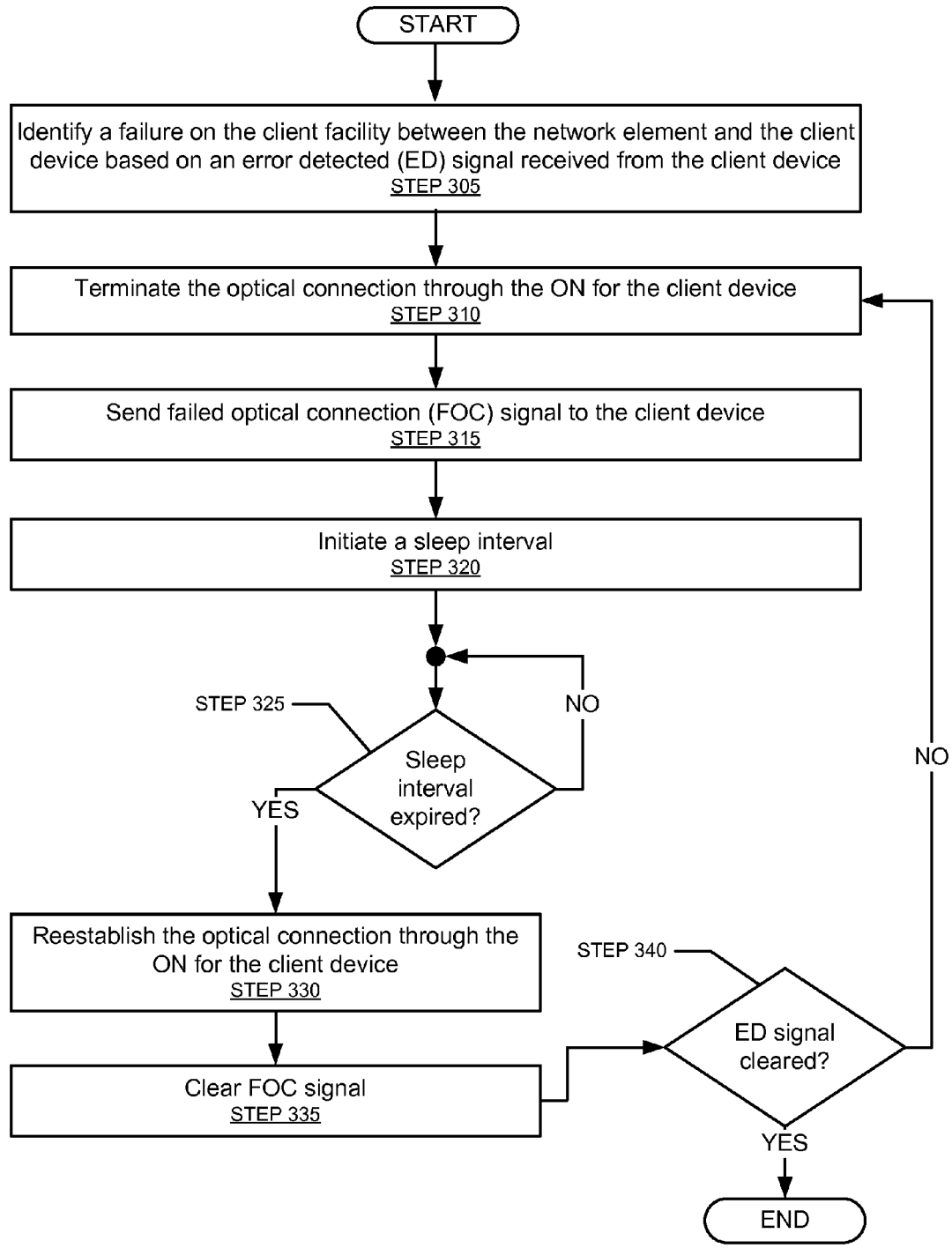

FIG. 3 shows a flowchart in accordance with one or more embodiments of the invention. The process depicted in FIG. 3 may be used to operate an optical network using a control plane. The process shown in FIG. 3 may be executed, for example, by one or more components (e.g., control plane (152), network element (104Y), client device Y (102Y)) discussed above in reference to FIG. 1. One or more steps shown in FIG. 3 may be omitted, repeated, and/or performed in a different order among different embodiments of the invention. Accordingly, embodiments of the invention should not be considered limited to the specific number and arrangement of steps shown in FIG. 3.

Initially, a failure on the client facility between the network element and the client device is identified (STEP 305). Specifically, the failure is identified based on the network element receiving an ED signal from the client device indicating it has detected an incoming failure. The failure may be a unidirectional failure towards the client device and the client device sends (i.e., asserts) the ED signal in response to the failure. The failure may be identified by the control plane of the ON to which the network element belongs.

In STEP 310, the optical connection through the ON for the client device is terminated. Specifically, the optical connection is terminated in response to identifying the failure on the client facility between the network element and the client device. During the initial set up of the optical connection, a request may have been received to invoke a connection release attribute. In one or more embodiments, termination of the optical connection is only possible because the connection release attribute was set/invoked for this optical connection during its initial set up. Termination (i.e., tear down) of the optical connection may be executed by the control plane of the ON. In one or more embodiments of the invention, the reason for the termination (i.e., client facility failed) is carried in the release signaling message.

In STEP 315, a FOC signal indicating failure of the optical connection through the ON is sent toward the client device over the client facility, or an attempt is made to send such a signal, to the client device. The FOC signal may be sent by the network element in response to the termination of the optical connection through the ON.

In STEP 320, a sleep interval is initiated. In one or more embodiments, the sleep interval is initiated in response to the release signaling message indicating that client facility failure is the reason for the termination (i.e., the sleep interval might not be initiated for terminations caused by other types of failures). The sleep interval may be of any duration (e.g., 60 seconds). Different sleep intervals may be of different durations. The sleep interval may be set by a network operator/administrator. The sleep interval may be initiated and monitored by the control plane of the ON. In STEP 325, it is determined whether the sleep interval has expired. When the sleep interval has expired, the process proceeds to STEP 330.

Those skilled in the art, having the benefit of this detailed description, will appreciate that the failure on the client facility between the network element and the client device might or might not have been resolved (i.e., repaired, corrected, cured, removed, etc.) during the sleep interval. If the failure was not resolved, the network element is still receiving the ED signal from the client device because of the failure. However, even if the failure was successfully resolved, the network element is still receiving the ED signal because the FOC signal is now reaching the client device, and the client device is responding to the FOC signal with the ED signal. Accordingly, the ED signal is ambiguous and because of this ambiguity, the control plane cannot rely on the ED signal to confirm the presence of the failure.

In STEP 330, the optical connection for the client device is reestablished. Specifically, the control plane of the ON reestablishes the optical connection without knowing whether the failure is still present or resolved. In STEP 335, the FOC signal being sent (or attempted to be sent) to the client device (i.e., STEP 315) is cleared in response to reestablishment of the optical connection. The FOC signal may be cleared by the network element.

In STEP 335, a determination is made whether the ED signal is cleared.

Specifically, it is determined whether the ED signal is still being sent by the client device to the network element following the clearance of the FOC signal. This determination may be executed by the control plane. In one or more embodiments, the control plane waits a predetermined amount of time (e.g., 5 seconds) before determining whether the ED signal is cleared. As discussed above, if the failure was resolved, then clearing the FOC signal should clear the ED signal. However, if the failure still exists, clearing the FOC signal will not clear the ED signal. When it is determined that the ED signal has cleared and thus the failure is resolved, the process may end. Otherwise, when it is determined that the ED signal has not cleared and thus the failure is still present, the process returns to STEP 310.

Various embodiments may have one or more of the following advantages: the ability to identify failures on the client facility between the network element and the client device; the ability to handle an ambiguous ED signal; the ability for a control plane in an ON to react to a client facing failure; the ability to invoke a connection release attribute during the initial setup of an optical connection; the ability to free up network resources including bandwidth by terminating an optical connection in an ON; the ability to periodically attempt reestablishing the optical connection or use event driven reestablishment; etc.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention.

Figure 4:
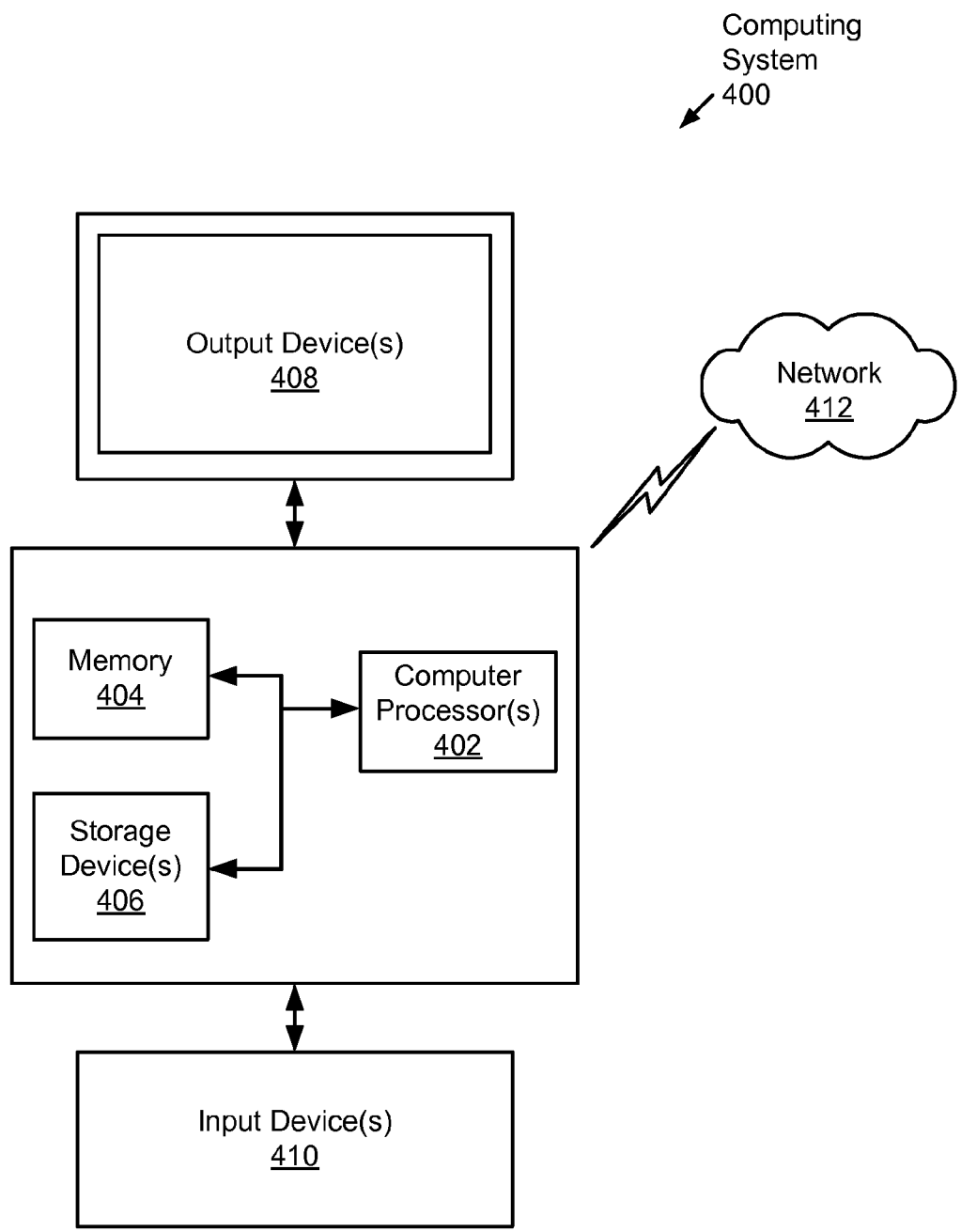
FIG. 4 shows a computer system in accordance with one or more embodiments of the invention.

For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The input and output device(s) may be locally or remotely connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other non-transitory computer readable storage medium. Specifically, the software instructions may correspond to computer readable program code that when executed by a processor(s), is configured to perform embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for operating an optical network (ON) using a control plane (CP), comprising:
identifying, by the CP, a failure of a client facility connecting a first network element of the ON and a client device by determining that the first network element has received an error detected (ED) signal from the client device, wherein the client facility is external to the ON;
terminating, by the CP and in response to identifying the failure, an optical connection through the ON for the client device between the first network element and a second network element of the ON, wherein the first network element sends a failed optical connection (FOC) signal to the client device in response to terminating the optical connection;
executing, by the CP, a first reestablishment of the optical connection through the ON for the client device after a first sleep interval, wherein the FOC signal is cleared in response to executing the first reestablishment of the optical connection;
terminating, by the CP, the reestablished optical connection in response to the ED signal not clearing after the FOC signal is cleared indicating that the failure is still present; and
executing, by the CP, a second reestablishment of the optical connection through the ON for the client device after the failure of the client facility is resolved.

2. The method of claim 1, further comprising:
sending the FOC signal to the client device in response to terminating the reestablished optical connection;
clearing the FOC signal in response to executing the second reestablishment of the optical connection,
wherein the failure is resolved before the FOC signal is cleared, and
wherein the ED signal is cleared in response to clearing the FOC signal and the failure being resolved.

3. The method of claim 1, further comprising:
sending the FOC signal to the client device in response to terminating the reestablished optical connection; and
replacing, by the first network element, the FOC signal with a valid data signal after a second sleep interval,
wherein the ED signal is cleared in response to replacing the FOC signal with the valid data signal.

4. The method of claim 1, further comprising:
receiving, during a setup of the optical connection, a request to invoke a connection release attribute,
wherein terminating the optical connection is further based on the connection release attribute;
identifying, within a release signaling message associated with the optical connection, a reason for terminating the optical connection; and
initiating the first sleep interval in response to the reason for terminating the optical connection being the failure of the client facility.

5. The method of claim 1, wherein the client device utilizes at last one signal type selected from a group consisting of Ethernet, digital video, OTN, and SONET/SDH.

6. A non-transitory computer readable medium (CRM) storing instructions for operating an optical network (ON) using a control plane (CP), the instructions comprising functionality for:
identifying, by the CP, a failure of a client facility connecting a first network element of the ON and a client device by determining that the first network element has received an error detected (ED) signal from the client device, wherein the client facility is external to the ON;
terminating, by the CP and in response to identifying the failure, an optical connection through the ON for the client device between the first network element and a second network element of the ON,
wherein the network element sends a failed optical connection (FOC) signal to the client device in response to terminating the optical connection,
wherein the network element replaces, after a first sleep interval, the FOC signal with a valid data signal, and
wherein the ED signal is cleared in response to replacing the FOC signal with the valid data signal; and
executing, by the CP, a first reestablishment of the optical connection in response to the ED signal being cleared.

7. The non-transitory CRM of claim 6, the instructions further comprising functionality for:
executing a second reestablishment of the optical connection for the client device after a second sleep interval;

clearing the FOC signal in response to executing the second reestablishment of the optical connection after the second sleep interval;

terminating the reestablished optical connection in response to the ED signal not clearing after the FOC signal is cleared indicating that the failure is still present; and sending the FOC signal from the first network element to the client device in response to terminating the reestablished optical connection.

8. The non-transitory CRM of claim 6, the instructions further comprising functionality for:

receiving, during a setup of the optical connection, a request to invoke a connection release attribute, wherein terminating the optical connection is further based on the connection release attribute;

identifying, within a release signaling message associated with the optical connection, a reason for terminating the optical connection; and initiating the first sleep interval in response to the reason for terminating the optical connection being the failure of the client facility.

9. The non-transitory CRM of claim 6, wherein the client device utilizes at last one signal type selected from a group consisting of Ethernet, digital video, OTN, and SONET/SDH.

10. A system, comprising:

a first network element belonging to an optical network (ON) and configured to:

receive an error detected (ED) signal from a client device connected to the first network element by a client facility, wherein the client facility is external to the ON, send a failed optical connection (FOC) signal to the client device in response to termination of an optical connection through the ON between the first network element and a second network element, and clear the FOC signal in response to a first reestablishment of the optical connection; and a control plane (CP) of the ON, associated with the first network element, and configured to:

identify a failure of the client facility between the first network element and the client device based on the ED signal, terminate, in response to the failure, the optical connection through the ON for the client device between the first network element and the second network element of the ON, execute the first reestablishment of the optical connection after a sleep interval, terminate the reestablished optical connection in response to the ED signal not clearing after the FOC signal is cleared indicating that the failure is still present, and execute a second reestablishment of the optical connection for the client device after the failure is resolved.

11. The system of claim 10, wherein the client device utilizes at last one signal type selected from a group consisting of Ethernet, digital video, OTN, and SONET/SDH.

12. The system of claim 10, wherein the first network element is further configured to:

clear the FOC signal in response to the second reestablishment of the optical connection, wherein the ED signal is cleared in response to clearing the FOC signal and the failure being resolved.

13. A method for operating an optical network (ON) using a control plane (CP), comprising:

identifying, by the CP, a failure of a client facility connecting a first network element of the ON and a client device, wherein the client facility is external to the ON;

terminating, by the CP and in response to identifying the failure, an optical connection through the ON for the client device between the first network element and a second network element of the ON;

detecting the failure is resolved after a sleep interval; and reestablishing, by the CP, the optical connection through the ON for the client device after the failure of the client facility is resolved, wherein reestablishment of the optical connection is triggered by the failure being resolved, and wherein the failure is one selected from a group consisting of a loss of frame, a loss of clock, an error ratio that exceeds a predetermined threshold, and a loss of data synchronization.

14. The method of claim 13, further comprising:

receiving, during a setup of the optical connection, a request to invoke a connection release attribute, wherein terminating the optical connection is further based on the connection release attribute;

identifying, within a release signaling message associated with the optical connection, a reason for terminating the optical connection; and initiating the sleep interval in response to the reason for terminating the optical connection being the failure of the client facility.

15. The method of claim 13, wherein the client device utilizes at last one signal type selected from a group consisting of Ethernet, digital video, OTN, and SONET/SDH.

16. The method of claim 13, further comprising:

receiving a routing update indicating that the failure is resolved, wherein reestablishment of the optical connection is triggered by the routing update.

* * * * *